United States Patent Office 3,115,446
Patented Dec. 24, 1963

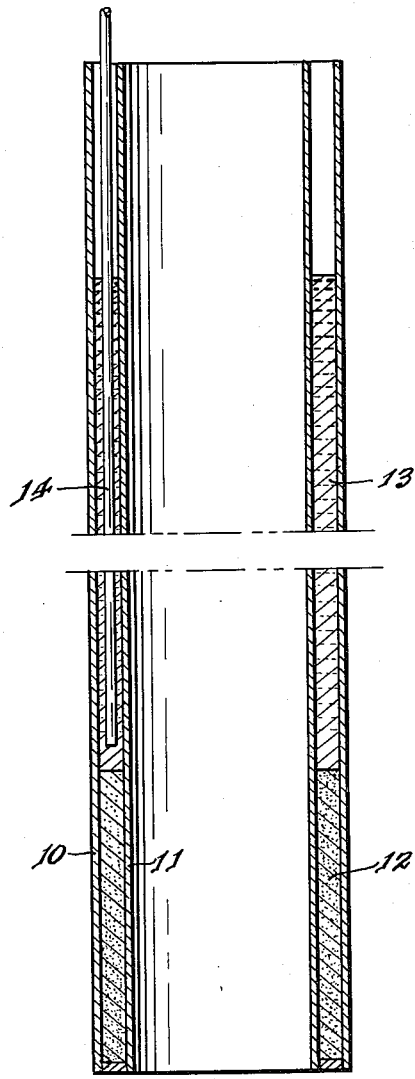

3,115,446
FUEL ELEMENTS FOR NUCLEAR REACTORS
Harold Montague Finniston, Abingdon, England, assignor, by mesne assignments, to the United States of America as represented by the United States Atomic Energy Commission
Filed Nov. 17, 1954, Ser. No. 469,356
5 Claims. (Cl. 204—154.2)

This invention relates to fuel elements for nuclear reactors and in particular to such fuel elements as are suitable for use in nuclear reactors operating at elevated temperatures up to 600° C. or even higher.

Nuclear reactors are described in United States patent specification No. 2,708,656 and United States patent application Serial No. 276,604, filed March 14, 1952.

In nuclear reactors operating at relatively high power levels, nuclear fuel elements comprising massive metal fuel are subject to radiation damage which necessitates their replacement earlier than would otherwise be necessary. Fission products also build up in the metal reducing their useful life in the reactor.

The object of the present invention is to provide a fuel element for a nuclear reactor which will be considerably less susceptible to damage by radiation in a nuclear reactor and in which the likelihood of escape of fission products from the fuel is greatly increased.

According to the invention a fuel element for a nuclear reactor comprises a container, a body of metal of melting point lower than that of the temperature of operation of the reactor and preferably below 600° C. and finely divided nuclear fuel in the body of metal.

The nuclear fuel may be an element fissionable by neutrons of thermal energy, such as plutonium 239, natural uranium, uranium enriched in the U235 isotope, uranium 233 or intermetallic compounds of any of those metals with metals of low melting point below 700° C., or chemical compounds of those metals which are stable at temperature up to at least 600 °C. Examples of such compounds are uranium dioxide, uranium carbide, uranium tetrafluoride and corresponding compounds of plutonium. A mixture of finely divided thorium or its compounds and any one of the nuclear fuels referred to may also be employed.

The container is preferably such as to provide a layer or annulus of the body of metal and contained nuclear fuel which is from one sixteenth to one tenth inch.

The invention will next be described in connection with the accompanying drawings wherein the single FIGURE is a diagrammatic view of a fuel element according to the present invention.

As shown in the drawing the fuel element comprises an outer tubular wall section 10, an inner tubular wall section 11 joined to the outer wall section at the bottom thereof, a settled slurry 12 of fissionable material in a liquid metal in the annular container formed by said wall sections, said settled slurry having a supernatant liquid 13 appearing thereabove, and a tube 14 for removing and replacing the supernatant liquid.

The fuel elements of the invention may comprise a settled slurry of the finely divided nuclear fuel in the body of liquid metal of lower melting point, in which case the ratio of the volume of the nuclear fuel to the body of metal may be of the order of 66 to 34. Alternatively the nuclear fuel element may comprise a suspension of the finely divided nuclear fuel in the body of metal of lower melting point in which case the finely divided nuclear fuel may amount to up to 40 percent of the combined volumes of the nuclear fuel and body of metal.

Metals of lower melting point which may be employed for the body of metal are sodium, lithium, lead, bismuth or entectic alloys of these metals. Mercury could be employed as the body of metal for fuel elements to be employed in pressurized reactors at pressures sufficiently high to suppress vaporization of the metal. In cases where an intermetallic compound of uranium or plutonium is employed as nuclear fuel it is preferred to employ the alloying metal of the compound as the body of metal containing the fuel. Suitable intermetallic compounds are $UPb_3$, $USn_3$, $UAl_4$, $PGa_3$, $U_3Bi_5$, the metals lead, tin, aluminium, gallium and bismuth respectively being employed as the body of metal containing the nuclear fuel.

The article size of the nuclear fuel is desirably very small, for example 10 microns or less.

The fuel elements of the invention may take the form of a tube of stainless steel or other corrosion resistant metal, closed at one end and formed as an annulus of from one sixteenth to one tenth of an inch width. The container may be described as formed of one tubular wall section inside another tubular wall section and which are joined at one end. The tube and contents is arranged vertically in the reactor core and is preferably provided with a tube extending downwardly into the annulus so that molten body metal and contained nuclear fuel may be withdrawn or fed into the annulus. Liquid metal cooling of the nuclear fuel elements cooling may be employed. A preferred liquid metal coolant is the metal of lower melting point forming the body of the fuel element.

The following are examples of combinations of nuclear fuel and body metals which are preferred.

(a) Uranium metal, natural, enriched in U235 or containing U233, or uranium 235 or uranium 233 and sodium or lithium (b) Uranium dioxide, the uranium being of any of the forms specified in (a) and sodium, or lead (c) Uranium carbide in lead, bismuth or sodium In the employment of nuclear fuel elements of the invention in which a settled slurry is used, the nuclear fuel may be incorporated in the molten metal body in the amount specified above and the molten mixture run into the container and allowed to settle while molten. The fuel element may then be inserted in the nuclear reactor so that the settled portion is in the core region.

Some control of the reactor may be obtained by drawing off some of the slurry through a tube referred to above. There will be a tendency for fission products to pass into the body of molten metal, the supernatant part of which may be withdrawn from time to time to remove fission product activity.

Where the nuclear fuel is maintained as a suspension, the temperature differentials in the nuclear fuel element in a nuclear reactor will tend to maintain the suspension by convection.

The metal of lower melting point chosen should wet the nuclear fuel which is to be incorporated therein, and should not react chemically with the nuclear fuel.

I claim:
1. A fuel element for a nuclear reactor comprising two tubular wall sections, one located inside the other and joined thereto at one end, forming thereby an annular container, a body of metal of melting point lower than the temperature of operation of the reactor in said annular container, and a nuclear fuel selected from the group consisting of elements fissionable by neutrons of thermal energy, intermetallic compounds thereof, and chemical compounds thereof in finely divided form dispersed in said body as a settled slurry of the nuclear fuel in the body of metal.

2. A fuel element according to claim 1 wherein the metal is sodium and the nuclear fuel is uranium.

3. A fuel element according to claim 1 wherein the metal is lithium and the nuclear fuel is uranium.

4. A fuel element according to claim 1 wherein the metal is lead and the nuclear fuel is uranium dioxide.

5. A fuel element according to claim 1 wherein the fuel element contains means for removing and replacing supernatant liquid metal from the settled slurry.

References Cited in the file of this patent

UNITED STATES PATENTS

| | | |
|---|---|---|
| 2,872,401 | Wigner et al. | Feb. 3, 1959 |
| 2,890,158 | Ohlinger et al. | June 9, 1959 |
| 2,900,315 | Ohlinger | Aug. 18, 1959 |

FOREIGN PATENTS

| | | |
|---|---|---|
| 861,390 | France | Oct. 28, 1940 |
| 648,293 | Great Britain | Jan. 3, 1951 |